Patented Mar. 17, 1936

2,034,297

UNITED STATES PATENT OFFICE 2,034,297

BINDING AGENTS AND A PROCESS OF PREPARING THEM

Max Heyse and Hans Persiel, Frankfort-on-the-Main-Hochst, Germany, assignors to I. G. Farbenindustrie Aktiengesellschaft, Frankfort-on-the-Main, Germany No Drawing. Application December 12, 1933, Serial No. 702,092. In Germany April 11, 1932

13 Claims. (Cl. 106—40)

The present invention relates to the improvement of binding agents, such as cellulose derivatives particularly cellulose esters and cellulose ethers, natural resins and artificial resins, drying oils and chlorinated rubber and to the products obtainable thereby.

We have found that said binding agents are given an excellent gelatinizing effect and an extremely great fastness to light by incorporating in them as plasticizing agent and softening agent a neutral ester produced by reacting diglycollic acid and an ether of a polyhydric alcohol, which still contains at least one free hydroxyl group in the polyhydric alcohol part of the molecule, for instance an alkyl ether or an aralkyl ether of said product.

The products are further distinguished by a good compatibility with vegetable oils, with natural resins and artificial resins, as for instance the products of the reaction between polyhydric alcohols and polybasic acids or polybasic acids and acids of the natural oils and fats, with the products of the polymerization of vinyl compounds together with caoutchouc and the transformation products thereof, for instance with chlorinated rubber and with many other binding agents and film-producers which are used for the manufacture of plastic masses, films, artificial silk, artificial leather, lacquers, varnishes, painting agents or the like.

As ethers of polyhydric alcohols which still contain at least one free hydroxyl group, there can be used in the first line the so-called glycollic ethers, for instance the alkyl ethers of the ethylene-glycol, 1:2-propylene-glycol and 1:3-butylene-glycol. Di-esters of diglycollic acid containing two radicals of the same ether alcohol can be used as well as mixed esters of different ether alcohols. It is likewise possible to use the mixed esters from glycollic ethers and aliphatic alcohols such as methanol, ethanol, butanol or the like without considerably impairing the good properties of the binding agents, and to use mixtures of the said esters.

Besides the diglycollic acid esters of the glycollic ethers and mixed esters thereof which are particularly easily accessible and relatively cheap, there can be used all the other analogous esters of diglycollic acid with ethers of polyhydric alcohols which still contain at least one free hydroxyl group, as for instance the esters and the mixed esters from dimethyline or diethyline or from the ethers of sorbitol, pentaerythrite or other polyhydric alcohols, it being possible to use esters which are derived from only one kind of ethers of different polyhydric alcohols, as well as esters which are derived from different ethers of different polyhydric alcohols.

The following examples serve to illustrate the invention, but they are not intended to limit it thereto, the parts being by weight:

(1) 12 parts of titanium dioxide,
   4 parts of zinc white,
   6 parts of castor oil,
   6 parts of the ester from 1 mol. of diglycollic acid and 2 mols of butoxy-3-butanol-1 are ground together in known manner to form a paste and are mixed with a lacquer from—
   10 parts of nitrocellulose,
   30 parts of butyl acetate,
   10 parts of butanol,
   5 parts of acetone or a substitute for acetone, and
   28 parts of benzine or toluene.

There is obtained a white varnish which does not turn yellow and, if required after dilution, is applied in the usual manner on paper, textile fabric, leather or artificial leather.

(2) Instead of the diglycollic acid ester named in Example 1, there is used the mixed ester from 1 mol. of diglycollic acid and 1 mol. of butoxy-3-butanol-1 and 1 mol. of butanol.

(3) A colorless coating lacquer of nitrocellulose fast to light and applicable to articles of all kinds, is made as follows, with the aid of polyvinyl acetate:—
   10 parts of collodion cotton,
   3 parts of polyvinyl acetate,
   3 parts of the ester from 1 mol. of diglycollic acid and 2 mols of methoxy-3-butanol-1 and
   84 parts of a mixture of solvents consisting of 2 parts of butyl acetate, 1 part of butanol and 2 parts of toluene.

(4) The ester from 1 mol. of diglycollic acid and 2 mols of methoxy-2-ethanol-1 is particularly suitable for plasticizing acetyl cellulose. For making a cable varnish for instance, there are dissolved
   12 parts of acetyl cellulose,
   5 parts of the aforenamed ester,
   3 parts of a mixture of alkylated para-toluene-sulfamides and
   6 parts of triphenyl phosphate
in 74 parts of acetone or a substitute for acetone.

(5) 10 parts of nitrocellulose,
   18 parts of a condensation product from glycerine, phthalic anhydride and a fatty acid,
   5 parts of the ester from 1 mol. of diglycollic acid, 1 mol. of methoxy-3-butanol-1 and 1 mol. of butanol,
   15 parts of a mixture of 7 parts of titanium dioxide and 3 parts of zinc sulfide,
   20 parts of butyl acetate,
   4 parts of butanol, and
   28 parts of toluene yield a wood varnish which is completely fast to light and atmospheric influences.

(6) A solution of:
15 parts of ethyl cellulose,
3 parts of an ester from 1 mol. of diglycollic acid, 1 mol. of butoxy-3-butanol-1 and 1 mol. of ethanol in
20 parts of butanol,
5 parts of methoxy-3-butanol-1-acetate,
23 parts of toluene and
20 parts of ethanol
is, for instance, suitable for a binding agent for very light printing colors and painting colors fast to light.

(7) When the ester from 1 mol. of diglycollic acid and 2 mols of butoxy-3-butanol-1 is used instead of tricresyl-phosphate in lacquers for metal foils, it is possible to dry rapidly at raised temperatures; there are obtained odorless lacquer coatings of an excellent fastness to heat and to light.

(8) A film from 100 parts of nitrocellulose and 30 parts of the ester from 1 mol. of diglycollic acid and 2 mols of butoxy-3-butanol-1 is caused to swell in the usual manner in a suitable solvent and then pressed between two sheets of glass. In this manner, there is obtained a splinterless glass of excellent mechanical and optical properties.

(9) 12 parts of chlorinated rubber and 3 parts of an ester from 1 mol. of diglycollic acid and 2 mols of butoxy-3-butanol-1 are dissolved in 35 parts of xylene and 40 parts of toluene. The solution obtained is ground together with 40 parts of red lead in known manner to form a varnish which, applied on cleaned iron, is a rust-preventive first layer upon which nitro-varnishes well adhere.

(10) a lacquer of good insulating properties is obtained from
25 parts of polystyrene,
5 parts of the diglycollic acid ester named in Example 9,
30 parts of xylene,
40 parts of toluene.

(11) 90 parts of a condensation product from phenol and formaldehyde are mixed with 10 parts of an ester from 1 mol. of diglycollic acid, 1 mol. of methoxy-3-butanol-1 and 1 mol. of ethanol and treated in known manner so as to form a press powder. The articles prepared therefrom are distinguished by an increased elasticity.

(12) 80 parts of a condensation product from urea and formaldehyde are treated with 20 parts of an ester from 1 mol. of diglycollic acid and 2 mols of methoxy-3-butanol-1 as described in Example 11, in order to obtain likewise improved mechanical properties. Furthermore, the products are completely fast to light.

(13) For spray-casting there are used mixtures prepared in known manner from 90 parts of acetyl cellulose and 10 parts of an ester from 1 mol. of diglycollic acid and 2 mols of methoxy-3-butanol-1.

(14) An addition of 10 parts of an ester from 1 mol. of diglycollic acid and 2 mols of butoxy-3-butanol-1 imparts to the products from polyacrylic acid derivatives a rubber-like extensibility and at the same time a good resistance to water.

The term "plasticizing agent" in the appended claim is to be understood as including agents having a plasticizing, softening and gelatinizing effect.

We claim:

1. A composition of matter comprising a binding agent of the group consisting of cellulose derivatives, particularly cellulose esters and ethers, natural resins, artificial resins, drying oils and chlorinated rubber with a plasticizing agent consisting of a neutral ester produced by reacting diglycollic acid and an ether of a polyhydric alcohol, the ether having one free hydroxyl group in the polyhydric alcohol part.

2. A composition of matter comprising a cellulose compound in mixture with a plasticizing agent consisting of a neutral ester produced by reacting diglycollic acid and an ether of a polyhydric alcohol the ether having one free hydroxyl group in the polyhydric alcohol part.

3. A composition of matter comprising a cellulose compound in mixture with a plasticizing agent consisting of a neutral ester produced by reacting diglycollic acid and an alkyl ether of a polyhydric alcohol the ether having one free hydroxy group in the polyhydric alcohol part.

4. A composition of matter comprising a cellulose compound in mixture with a plasticizing agent consisting of a neutral ester produced by reacting diglycollic acid and an ether of the group consisting of the alkyl and aralkyl ethers of polyhydric alcohols the ether having one free hydroxyl group in the polyhydric alcohol part.

5. A composition of matter comprising a cellulose compound and a plasticizing agent consisting of a neutral mixed ester produced by reacting diglycollic acid, an aliphatic alcohol and an ether of a polyhydric alcohol the ether having one free hydroxyl group in the polyhydric alcohol part.

6. A composition of matter comprising a resin in mixture with a plasticizing agent consisting of a neutral ester produced by reacting diglycollic acid and an ether of a polyhydric alcohol the ether having one free hydroxyl group in the polyhydric alcohol part.

7. A composition of matter comprising a resin in mixture with a plasticizing agent consisting of a neutral ester produced by reacting diglycollic acid and an alkyl ether of a polyhydric alcohol the ether having one free hydroxyl group in the polyhydric alcohol part.

8. A composition of matter comprising a resin in mixture with a plasticizing agent consisting of a neutral ester produced by reacting diglycollic acid and an ether of the group consisting of the alkyl and aralkyl ethers of polyhydric alcohols the ether having one free hydroxyl group in the polyhydric alcohol part.

9. A composition of matter comprising a resin in mixture with a plasticizing agent consisting of a neutral mixed ester produced by reacting diglycollic acid, an aliphatic alcohol and an ether of a polyhydric alcohol the ether having one free hydroxyl group in the polyhydric alcohol part.

10. A composition of matter comprising a drying oil in mixture with a plasticizing agent consisting of a neutral ester produced by reacting diglycollic acid and an ether of a polyhydric alcohol the ether having one free hydroxyl group in the polyhydric alcohol part.

11. A composition of matter comprising a drying oil in mixture with a plasticizing agent consisting of a neutral ester produced by reacting diglycollic acid and an alkyl ether of a polyhydric alcohol the ether having one free hydroxyl group in the polyhydric alcohol part.

12. A composition of matter comprising a drying oil in mixture with a plasticizing agent consisting of a neutral ester produced by reacting diglycollic acid and an ether of the group consisting of the alkyl and aralkyl ethers of polyhydric alcohols the ether having one free hydroxyl group in the polyhydric alcohol part.

13. A composition of matter comprising a drying oil and a plasticizing agent consisting of a neutral mixed ester produced by reacting diglycollic acid, an aliphatic alcohol and an ether of a polyhydric alcohol the ether having one free hydroxyl group in the polyhydric alcohol part.

MAX HEYSE.
HANS PERSIEL.